March 10, 1964    A. A. SOMLITZ    3,124,325
RIP CORD HANDLE GUARD FOR CHEST TYPES OF PARACHUTES
Filed Jan. 25, 1963    2 Sheets-Sheet 1
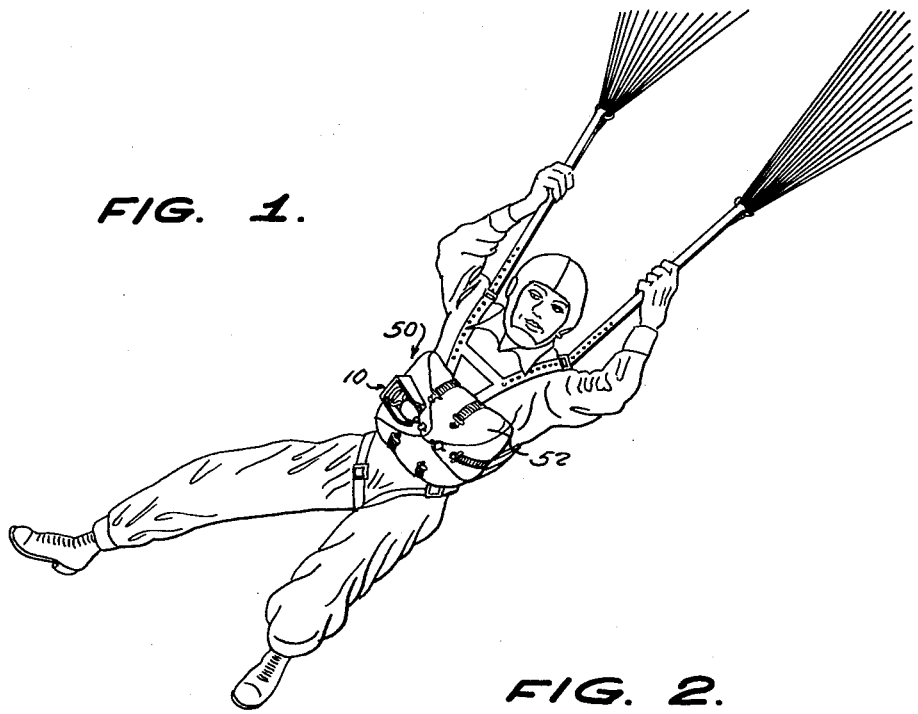
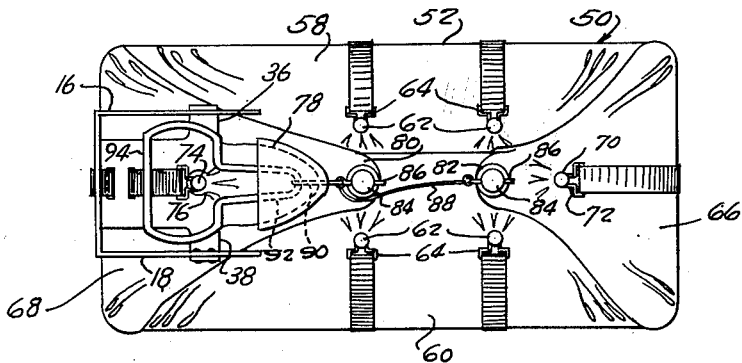
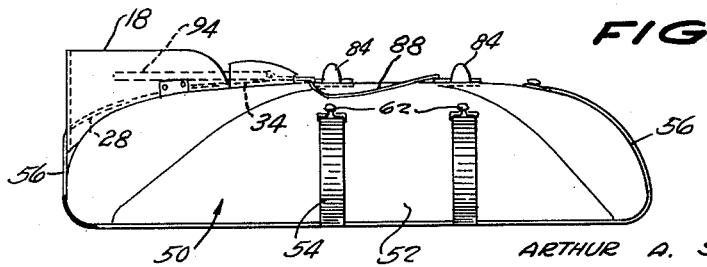
INVENTOR.
ARTHUR A. SOMLITZ,
BY
McMorrow, Berman + Davidson
ATTORNEYS.

March 10, 1964  A. A. SOMLITZ  3,124,325
RIP CORD HANDLE GUARD FOR CHEST TYPES OF PARACHUTES
Filed Jan. 25, 1963  2 Sheets-Sheet 2

INVENTOR.
ARTHUR A. SOMLITZ,
BY
McMorrow, Berman & Davidson
ATTORNEYS.

United States Patent Office 3,124,325
Patented Mar. 10, 1964

3,124,325
RIP CORD HANDLE GUARD FOR CHEST
TYPES OF PARACHUTES
Arthur A. Somlitz, Vienna, Ohio
(2115 Ewalt Ave. NE., Warren, Ohio)
Filed Jan. 25, 1963, Ser. No. 253,888
5 Claims. (Cl. 244—149)

This invention relates to a safety device and, more specifically, the instant invention pertains to means for preventing the premature opening of parachutes.

According to modern practice, chest-type reserve parachutes as worn by paratroopers, sport enthusiasts who engage in parachuting, and/or sky divers, are usually provided with a rip cord handle that protrudes toward one end of the pack. Necessarily, the rip cord handle must be so placed as to be immediately available to the parachuter at the appropriate time. However, the location of the rip cord handle gives rise to a number of problems, for example, the handle may be smacked or brushed off, whereby the parachute is prematurely deployed.

While parachuters are trained to protect the rip cord handle from inadvertent and accidental actuation thereof by covering the same with the hand, still the most expert ones thereof are prone to momentary forgetfulness. This frequently leads to loss of life and destruction of the aircraft.

Thus, one of the primary objects of this invention is to provide a rip cord handle guard to prevent premature actuation thereof.

A further object of this invention is to provide a rip cord handle guard which will not impair or impede the actuation thereof.

Another object of this invention is to provide means for preventing the inadvertent or accidental actuation of a rip cord handle, the means being readily adaptable to conventional chest type paracutes.

This invention contemplates, as a still further object thereof, the provision of a guard for the rip cord handle of a parachute, the guard being non-complex in construction and assembly, inexpensive to manufacture, and which is durable in use.

Other and further objects and advantages of the instant invention will become more evident from a consideration of the following specification when read in conjunction with the annexed drawings, in which:

FIGURE 1 is a perspective view illustrating a rip cord handle guard constructed in accordance with this invention and illustrating the same in actual use;

FIGURE 2 is a front elevational view of the chest type parachute illustrating the application of a rip cord handle guard constructed in accordance with this invention;

FIGURE 3 is a side elevational view of the cord of the guard;

Figure 4:
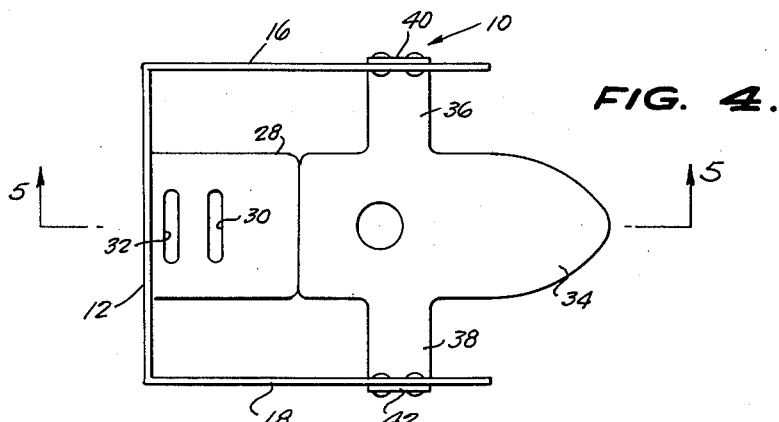
FIGURE 4 is a top plan view of the rip cord handle guard according to this invention.

Reference numeral 10 designates, in general, a rip cord handle guard for chest type parachutes, the guard being constructed in accordance with the teachings of this invention. The guard 10 is formed of any suitable rigid material and is seen to comprise a substantially rectangular front face panel 12 having a substantially rectangular centrally-located window 14 extending transversely therethrough. Integral with the panel 12 are a pair of laterally-extending integral side walls 16, 18 which project from the opposed side edges of the panel 12, the side walls 16, 18 extending in the same direction and being substantially parallel one with respect to the other. The width of the side walls 16, 18 tapers toward their respective free ends due to an arcuate undercut 20, 22 formed in their lower edges, respectively. The outer free ends of the side walls 16, 18 terminate in arcuate ends 24, 26, respectively.

The material displaced in forming the window 14 is retained integrally with the lower edge thereof and is extended in the same direction as the side walls 16, 18, and is located centrally therebetween. The displaced material forms an upwardly-bowed tongue 28 in which are formed a pair of longitudinally-spaced and parallel substantially-rectangular slots 30, 32. The slots 30, 32 are located adjacent the inner end of the tongue 28.

Figures 5, 6:
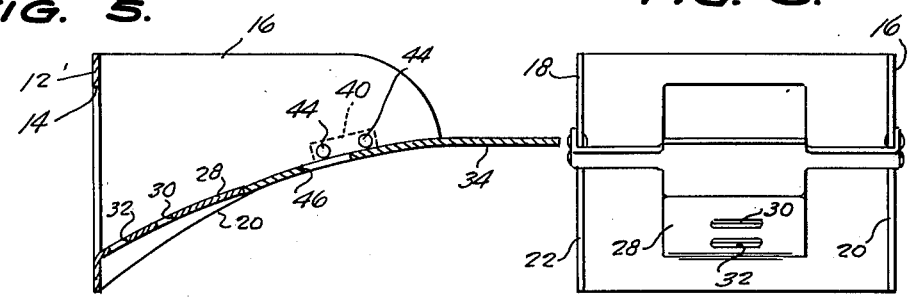
FIGURE 5 is a detail cross-sectional view taken substantially on the horizontal plane of line 5—5 of FIGURE 4, looking in the direction of the arrows.
FIGURE 6 is an end elevational view of the guard.
Figure 7:
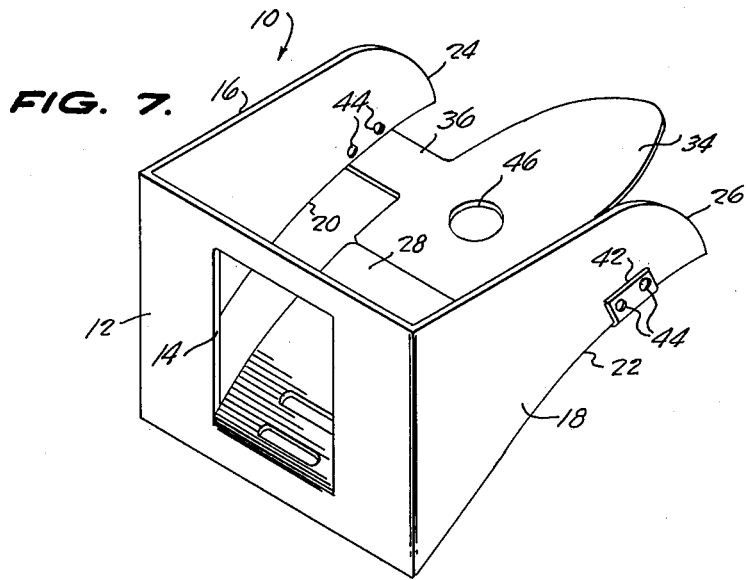
FIGURE 7 is an enlarged perspective view of the rip cord handle guard in accordance with the construction of this invention.

Reference numeral 34 denotes an ogive-shaped plate, also upwardly-bowed (see FIGURE 5), and having laterally-projecting flanges 36, 38. The base of the plate 34 abuts the free end of the tongue 28, and the outer ends of the flanges 36, 38 are bent upwardly to form tabs 40, 42 which are flush with the side walls 16, 18, respectively, and which are fixedly secured thereto by rivets 44. The plate 34, adjacent its base end is provided with a centrally-located transversely-extending circular opening 46.

Reference numeral 50 (see FIGURES 1 to 3, inclusive) denotes a conventional chest-type reserve parachute enclosed in the usual envelope 52 and which includes the elastic straps 54 which extend transversely about the envelope 52, and the longitudinally-extending strap 56. The outer terminal ends of the straps 54 connect to side flaps 58, 60 of the envelope 52 via buttons and hooks 62, 64, respectively, and the end flaps 66, 68 of the envelope 52 are connected through the buttons and hooks 70, 72 and 74, 76 with the outer terminal ends of the strap 56. The flap 68 normally has secured thereto a substantially hollow rip cord handle pocket 78 adjacent its tip 80, and the tip 80 as well as the tip 82 of the flap 66 are apertured to releasably extend over the pegs 84 connected to the envelope 52, the tips 80, 82 being releasably secured on the pegs 84 by means of the conventional rip cord pins 86. A flexible cord 88 ties together an end of each pin 86, and a link 90 connects the aforementioned end of one of the pins 86 with the bight end 92 normally positioned within the pocket 78 of a conventional rip cord handle 94.

The chest or reserve-type parachute 50 described immediately above is old and well-known in this art and requires no further description, since it, per se, forms no part of this invention. However, to utilize the instant invention in connection with this conventional parachute, no modfication or revision in construction is required. In the incorporation of the guard 10 with the parachute 50 it is only necessary to thread that end of the strap 56 which overlies the flap 68 through the window 14, and then downwardly through the slot 32, and subsequently upwardly through the slot 30. This end of the strap is then extended longitudinally across the tongue 28 and across the ogive plate 34. The guard 10 is so positioned as to receive the rip cord handle 94 therein and the aperture 46 formed in the plate 34 receives the button 74 therethrough after which the hook 76 is engaged thereabout.

It is thus seen that the lower end of the panel 12, as well as the tongue 28 and plate 34 engage and rest upon the flap 68 with the handle 94 in guarded position so that the same may not be inadvertently snagged, pulled, or otherwise accidentally pulled to cause displacement of the rip cord pins 86 from the pegs 84 to permit release of the chest-type or reserve parachute.

The parachute 50 may be opened by the user by either hand. In FIGURE 1 of the drawing the user will normally reach over the sidewall 12 to grasp and pull the handle 94, or optionally, the user need only to press the handle 94 toward the tongue 28 to effect the pivotal movement thereof, the bight portion 92 pivoting on the plate 34 in order to effect the withdrawal of the pins 86.

Having described and illustrated one embodiment of this invention in detail, it will be understood that the same is offered merely by way of example, and that the scope of this invention is to be limited only by the appended claims.

What is claimed is:

1. As an article of manufacture, a guard to receive the rip cord handle of a chest or reserve type parachute and comprising a panel having a substantially rectangular configuration, said panel having a pair of side walls projecting, respectively, laterally therefrom adjacent a pair of opposed sides of said panel, said side walls being disposed in spaced, parallel and confronting relation relative to one another, said panel having a centrally-located substantially rectangular window formed therein extending transversely therethrough, a tongue fixedly connected to said panel and projecting laterally therefrom adjacent a marginal edge of said window, said tongue being disposed between said side walls in spaced relation relative thereto, said tongue having a pair of spaced substantially rectangular slots formed therein and extending transversely therethrough, a plate adjacent an end of said tongue, means fixedly securing said plate to said side walls.

2. An article of manufacture as defined in claim 1, and said plate having a substantially ogive configuration and having its base abutting the outer end of said tongue.

3. An article of manufacture as defined in claim 1, wherein said tongue and plate are bowed in the same direction.

4. An article of manufacture as defined in claim 1, wherein the outer ends of said side walls are arcuately shaped.

5. In combination with a chest or reserve type parachute having an envelope, flexible strap means on said envelope, a rip cord handle-receiving pocket, and a rip cord handle disposed within said pocket; rip cord handle guard means comprising a panel having a substantially rectangular configuration, said panel having a pair of side walls projecting, respectively laterally therefrom adjacent the opposed sides of said panel, said side walls being disposed in spaced, parallel and confronting relation relative to one another, said panel having a centrally-located substantially-rectangular window formed therein and extending transversely therethrough, a tongue fixedly connected to said panel and projecting laterally therefrom adjacent a marginal edge of said window, said tongue being disposed between said side walls in spaced relation relative thereto, said tongue having a pair of spaced substantially-rectangular slots formed therein and extending transversely therethrough, a plate adjacent an end of said tongue, means fixedly securing said plate to said side walls with said plate extending into said pocket, and said flexible strap means being threaded through said window and said slots.

References Cited in the file of this patent
UNITED STATES PATENTS

| 896,936 | Paegel | Aug. 25, 1908 |
| 2,362,488 | Jahn | Nov. 14, 1944 |

FOREIGN PATENTS

| 475,245 | Great Britain | Nov. 16, 1937 |